United States Patent
Nakamura

(10) Patent No.: US 6,525,894 B1
(45) Date of Patent: Feb. 25, 2003

(54) TAPE DRIVE APPARATUS AND METHOD FOR MOUNTING A VOLUME FROM A TAPE MEDIUM

(75) Inventor: Hideki Nakamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/559,608

(22) Filed: Apr. 27, 2000

Related U.S. Application Data

(63) Continuation of application No. PCT/JP99/04704, filed on Aug. 31, 1999.

(30) Foreign Application Priority Data

Sep. 3, 1999 (JP) .......................................... 10-249446

(51) Int. Cl.$^7$ .............................................. G11B 5/09
(52) U.S. Cl. ...................... 360/49; 360/72.2; 360/78.14
(58) Field of Search .............................. 360/48, 47, 49, 360/72.2, 78.14, 92; 235/385, 462.01

(56) References Cited

U.S. PATENT DOCUMENTS 5,712,740 A * 1/1998 Kikuchi et al. ................ 360/48
5,971,281 A * 10/1999 Frary et al. .................. 235/487
6,181,498 B1 * 1/2001 Kikuchi et al. ................ 360/53

FOREIGN PATENT DOCUMENTS

JP 4-285783 10/1992

* cited by examiner

*Primary Examiner*—Alan T. Faber
(74) *Attorney, Agent, or Firm*—Frommer Lawrence & Haug LLP; William S. Frommer; Darren M. Simon

(57) ABSTRACT

A method of mounting a volume from a tape medium on a tape drive apparatus. The method reads a bar-code indicating the volume from a tape cartridge, attaches the tape cartridge to a tape drive, and detects the current track position on the basis of a longitudinal track. The method then determines whether a beginning volume label or a last used area volume label is nearer to the current track position, reads the nearer volume label from the tape medium, confirms the volume by comparing the nearer volume label with the bar-code, and mounts the volume onto the tape drive.

8 Claims, 12 Drawing Sheets

TAPE DRIVE APPARATUS AND METHOD FOR MOUNTING A VOLUME FROM A TAPE MEDIUM

This is a continuation of copending International Application PCT/JP99/04704 having an international filing date of Aug. 31, 1999.

TECHNICAL FIELD

The present invention relates to a recording apparatus, a recording method, a reproducing apparatus, a reproducing method, and a record medium that allow a volume label of a record medium such as a magnetic tape on which data is sequentially recorded and reproduced to be read at high speed.

RELATED ART

In a computer system, a changer apparatus that accommodates many cassette cartridges has been used to accomplish a data library. In the changer apparatus, several ten to several thousand cassette cartridges are placed in designated positions of a bin. In addition, at least one recording/reproducing apparatus (tape drive) is built in the changer apparatus. The changer apparatus is connected to a host computer that operates on UNIX as an OS (Operating System) through SCSI (Small Computer System Interface) as an interface.

The host computer has a database for managing the data library. The database contains information about cassette cartridges accommodated in the changer apparatus. The cassette cartridges are managed as volumes. The cassette cartridges are identified with bar codes placed thereon and volume labels recorded in predetermined record areas thereof.

The changer apparatus has a bar code reader and a cassette cartridge conveying mechanism. The bar code reader reads a bar code from a cassette cartridge. The cassette cartridge conveying mechanism automatically conveys a designated cassette cartridge to a designated recording/reproducing apparatus. When particular data is designated, the host computer searches the library management database for a relevant volume. Corresponding to the designated volume, the changer apparatus automatically searches a relevant cassette cartridge and attaches the cassette cartridge to a relevant tape drive.

When the cassette cartridge is attached to the tape drive, it is determined whether or not the cassette cartridge matches the designated volume. In other words, the tape drive reads the volume label at a predetermined position of the magnetic tape. Thereafter, it is determined whether or not the content of the volume label matches the value of the bar code. When they match, the volume is mounted to the system. Thus, the system can read and write data from/to the volume.

Conventionally, a volume label is written at only the beginning end of each volume. Thus, when a volume is mounted, it is necessary to seek the position of the volume label. Consequently, it takes a long time after a volume label is read until the volume is mounted.

For example, in the case that a cassette cartridge that has not been rewound from the last write position is accommodated to the bin of the changer, when the tape is used next time, the tape should be rewound to the beginning and then the volume label should be sought.

DISCLOSURE OF THE INVENTION

Therefore, an object of the present invention is to provide a recording apparatus, a recording method, a reproducing apparatus, a reproducing method, and a record medium that allow a volume of a sequential medium to be mounted at high speed.

To solve the above-described problem, the present invention is a recording apparatus for mounting a volume composed of a sequential record medium and recording data thereto, comprising a current position detecting means for detecting the curent seek-position of the volume, and a volume label writing means for writing to the last data position of the volume a second volume label whose content is the same as the content of a first volume label recorded on the beginning end side of the volume and adapted for identifying the volume, when the volume is unmounted, if the current-seek position detected by the current position detecting means is the last data position of the volume.

In addition, the present invention is a reproducing apparatus for mounting a volume composed of a sequential record medium and reproducing data therefrom, comprising a current position detecting means for detecting the current seek-position of the volume, and a volume label reading means for reading a first volume label or a second volume label whichever closer corresponding to the current seek-position detected by the current position detecting means when the volume is mounted, the first volume label and the second volume label being placed on the beginning end side and the last end side of the volume, respectively, the content of the first volume label being the same as the content of the second volume label, the first volume label being adapted for identifying the volume.

In addition, the present invention is a recording method for mounting a volume composed of a sequential record medium and recording data thereto, comprising the steps of (a) detecting the curent seek-position of the volume, and (b) writing to the last data position of the volume a second volume label whose content is the same as the content of a first volume label recorded on the beginning end side of the volume and adapted for identifying the volume, when the volume is unmounted, if the current-seek position detected at step (a) is the last data position of the volume.

In addition, the present invention is a reproducing method for mounting a volume composed of a sequential record medium and reproducing data therefrom, comprising the steps of (a) detecting the current seek-position of the volume, and (b) reading a first volume label or a second volume label whichever closer corresponding to the current seek-position detected at step (a) when the volume is mounted, the first volume label and the second volume label being placed on the beginning end side and the last end side of the volume, respectively, the content of the first volume label being the same as the content of the second volume label, the first volume label being adapted for identifying the volume.

In addition, the present invention is a record medium on which data is sequentially recorded and reproduced, wherein volume labels for identifying a volume are placed on the beginning end side and the last end side of the volume.

As described above, according to the recording apparatus and the recording method of the present invention, when data is recorded to a mounted volume and then the volume is unmounted, the current seek-position is detected. When the current seek-position is the last data position, the second volume label whose content is the same as the content of the first volume label placed on the beginning end side of the volume is written to the last data position. Thus, the same volume labels can be placed on the beginning end side and the last end side of the volume.

In addition, according to the reproducing apparatus and the reproducing method of the present invention, when a volume is mounted, the current seek-position is detected. Corresponding to the detected position, the first volume label placed on the beginning end side of the volume or the second volume label (that is the same as the first volume label) placed on the last end side of the volume whichever closer is read. Thus, the volume label can be read at high speed.

According to the record medium of the present invention, since volume labels adapted for identifying a volume are placed on the beginning end side and the last end side of the volume, they can be read at high speed. In addition, the reliability of the record medium is improved.

BEST MODES FOR CARRYING OUT THE INVENTION

Figure 1:
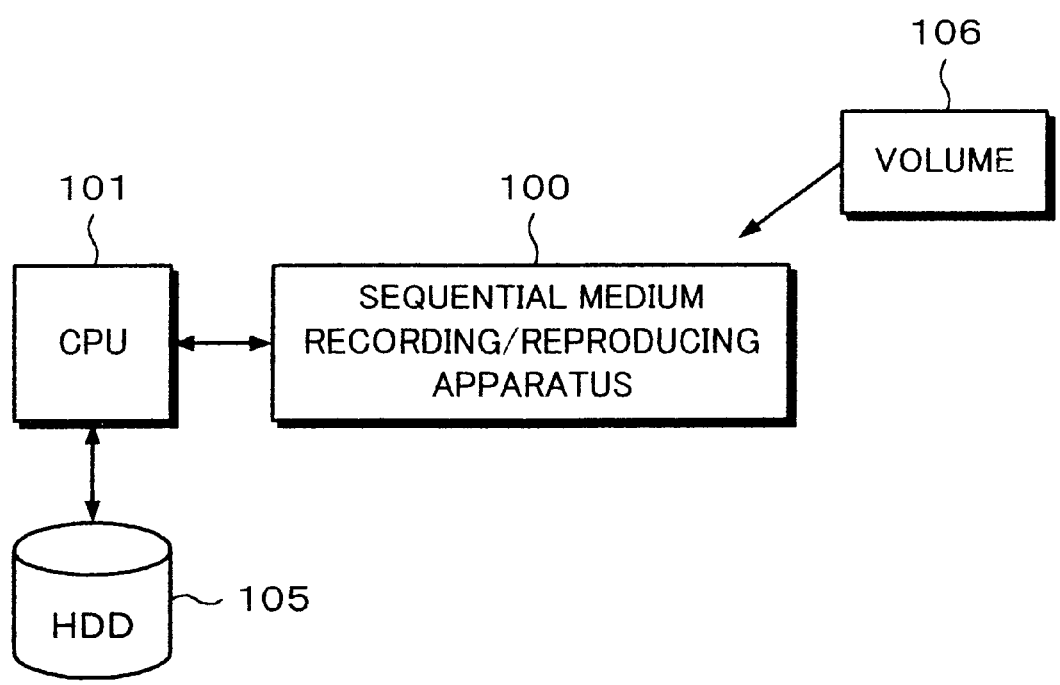
FIG. 1 is a block diagram showing an example of the system structure according to an embodiment of the present invention.

Next, with reference to the accompanying drawings, an embodiment of the present invention will be described. FIG. 1 shows an example of the system structure according to an embodiment of the present invention. A sequential medium recording/reproducing apparatus 100 (hereinafter referred to as recording/reproducing apparatus 100) records and reproduces data to/from a volume composed of for example a sequential record medium such as a magnetic tape. The recording/reproducing apparatus 100 is connected to a computer system such as a personal computer or a file server. The computer system comprises a CPU 101 and a hard disk drive 105 connected thereto as shown in FIG. 1. The recording/reproducing apparatus 100 records and reproduces data to/from the volume 106 corresponding to an application program that runs on the CPU 101.

Figure 2:
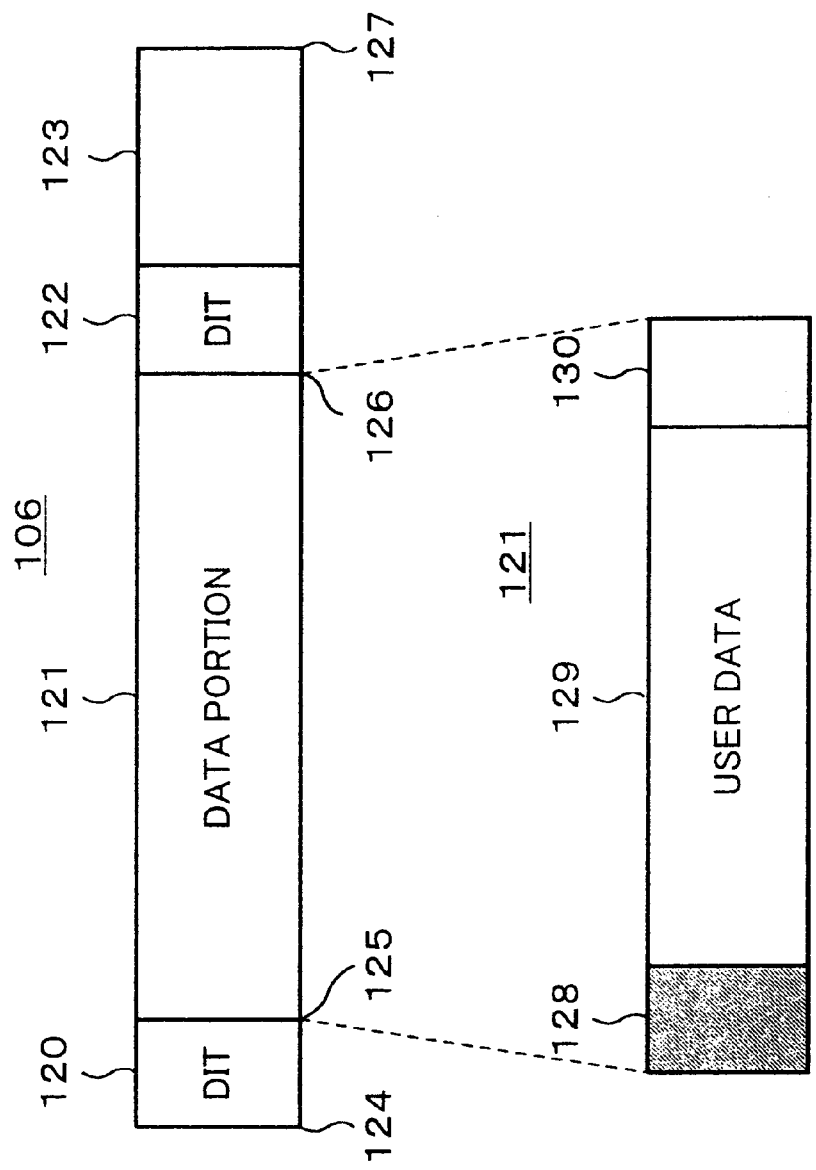
FIGS. 2A and 2B are schematic diagrams showing examples of a data format on a magnetic tape for use with the system according to the embodiment of the present invention.

FIGS. 2A and 2B are schematic diagrams showing examples of the data format of a magnetic tape for use with the system. Referring to FIG. 2A, from the beginning 124 of a medium composed of for example a magnetic tape, a DIT (Directory Information Table) 120 is placed. As will be described later, the DIT 120 contains management information of data recorded on the tape. The DIT 120 is followed by a data area 121. A plurality of files can be placed in the data area 121. From the last end 126 of the data area 121, a DIT 122 is placed. The DIT 122 contains the same information as the DIT 120. The DIT 122 is followed by an area 123. The area 123 is a blank portion. The area 123 is placed up to a last end 127 of the medium.

FIG. 2B shows the detail of the data area 121 shown in FIG. 2A. At the beginning of the data area 121, a beginning end volume label 128 is disposed. The beginning end volume label 128 contains identification information of the volume 106. When the volume 106 is used first time, the CPU 101 creates and writes the beginning end volume label 128 to the volume 106. The volume label 128 is followed by a user data area 129. The user data area 129 is an area in which user data is recorded. The user data area 129 is followed by a last end volume label 130. The content of the last end volume label 130 is the same as the content of the beginning end volume label 128.

When the volume 106 is attached to the recording/reproducing apparatus 100 and information recorded in the DIT 120 or 122 is read, the volume 106 is loaded to the recording/reproducing apparatus 100. When the volume 106 is loaded to the recording/reproducing apparatus 100, data recorded in the volume 106 can be accessed by an upper system of the recording/reproducing apparatus 100 (for example, the OS (Operating System) of the CPU 101) or a control application program (that runs on the CPU 101) of the recording/reproducing apparatus 100.

Next, the volume label 128 or 130 is read corresponding to the information recorded in the DIT 120 or 122, respectively. Thus, the volume 106 is mounted to the system. When the volume 106 is mounted to the system, the volume 106 can be used for the file system. Consequently, the volume 106 can be used by the upper system (for example, an application program that runs on the OS of the CPU 101).

According to the embodiment of the present invention, the volume 106 is a record medium composed of a magnetic tape housed in a predetermined cassette cartridge. For example, a bar code or a particular seal representing information unique to each cassette cartridge is placed on the cassette cartridge so that the recorded volume label just accords with the volume 106.

Figure 3:
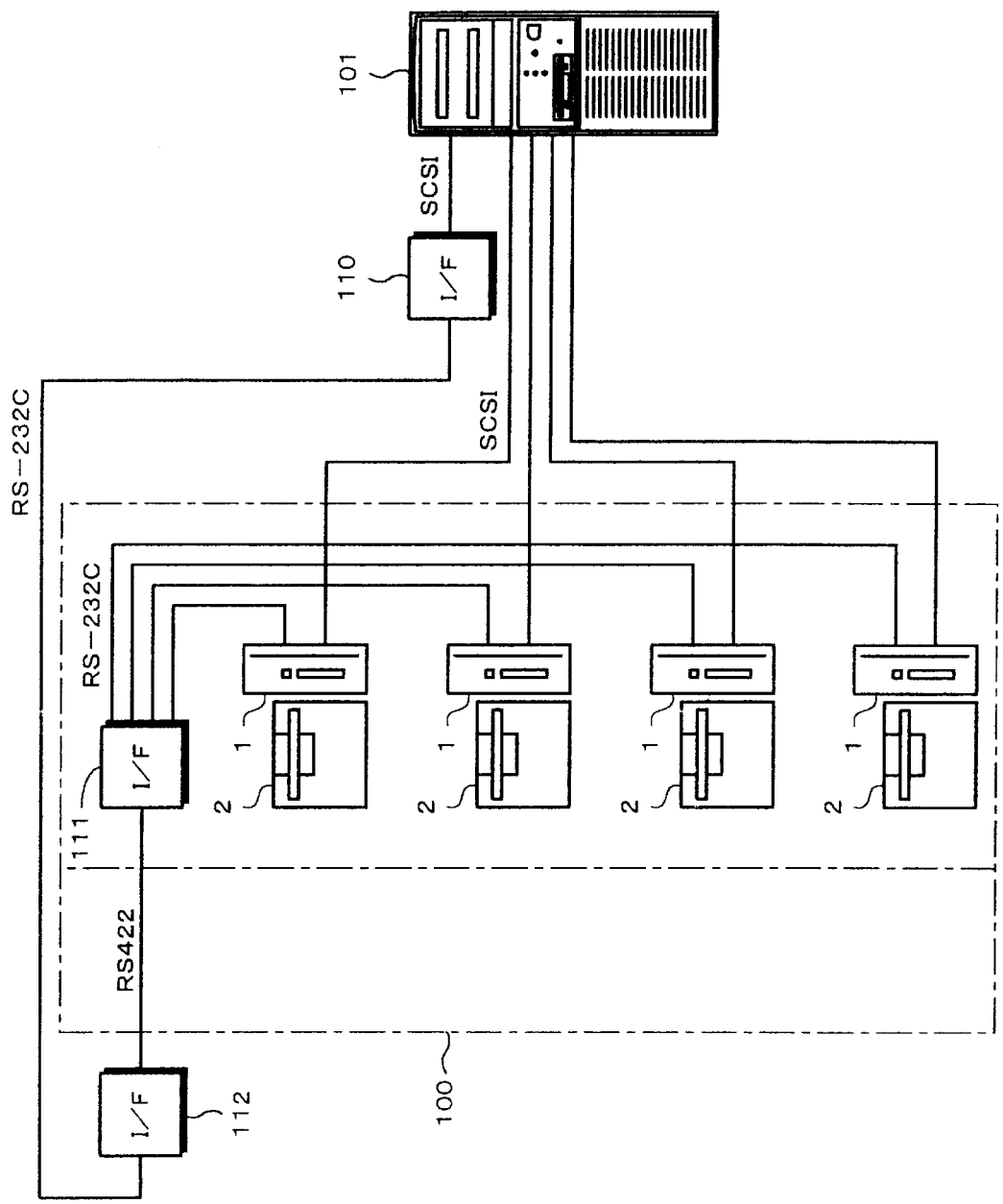
FIG. 3 is a block diagram showing an example of the system structure according to the embodiment of the present invention.

FIG. 3 shows a real example of the structure of the system shown in FIG. 1. In this example, the sequential medium recording/reproducing apparatus 100 is a cassette changer apparatus. In other words, referring to FIG. 3, the recording/reproducing apparatus 100 has a four tape drives and a bin. Each of the tape drives comprises a controlling portion 1 and a driving portion 2. The bin is disposed on the left of the apparatus 100. The bin can accommodate many cassette cartridges.

In addition, the recording/reproducing apparatus 100 further comprises a conveying mechanism and a bar code reader (not shown). The conveying mechanism automatically conveys a cassette cartridge between the bin and a relevant tape drive. The bar code reader automatically reads a bar cord from a cassette cartridge. Bar code information that is read by the bar code reader is supplied to the controlling portion 1.

The number of tape drives and the number of cassette cartridges accommodated in the bin are designated corresponding to the scale of the system. For example, in a small system, a bin that accommodates several ten cassette cartridges may be used. In a large system, a bin that accommodates several hundred to several thousand cassette cartridges may be used. Likewise, the number of tape drives are designated corresponding to the scale of the bin, the required data transmission rate, and so forth.

In this example, the CPU 101 is a file server that runs on UNIX as an OS and causes the recording/reproducing apparatus 100 to read and write data corresponding to a predetermined application program. In the description that follows, the application program that accomplishes the file server that runs on the above-described OS is referred to as client of the recording/reproducing apparatus 100. In addition, a process on the OS of the CPU 101 or a process of a control application program of the recoding/reproducing apparatus 100 is referred to as "process of the CPU 101" so as to distinguish it from the process of the client.

The CPU 101 and the recording/reproducing apparatus 100 are connected through SCSI (Small Computer System Interface) as an interface. In the example, four SCSI cables are connected to the four tape drives of the recording/ reproducing apparatus 100 so as to transfer data. In addition, one SCSI cable is used so as to control the recording/ reproducing apparatus 100.

The controlling SCSI cable is connected to an I/F 110. The I/F 110 is connected to an I/F 112 of the recording/ reproducing apparatus 100 through a serial interface such as RS-232C. The I/F 112 is connected to an I/F 111 through RS-422. The I/F 111 is connected to the four tape drives with four RS-232C cables.

The CPU 101 has a database of library information of tapes accommodated in the recording/reproducing apparatus 100. The database contains the contents of individual volumes, historical information of the tapes, and so forth. For example, whenever a tape is used, the operation history thereof, the last tape position, and so forth are recorded to the database.

Figure 4:
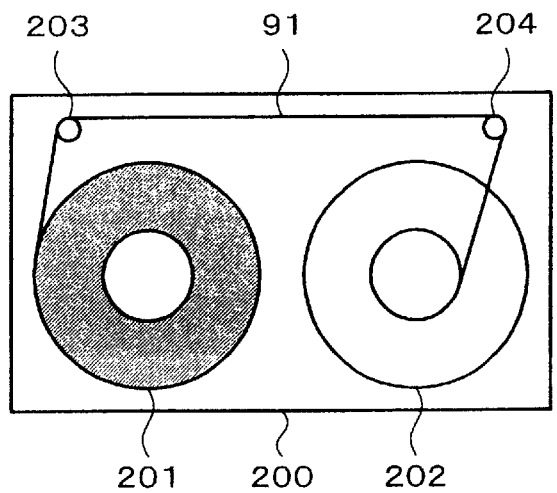
FIG. 4 is a schematic diagram showing the structure of a cassette cartridge.

FIG. 4 is a schematic diagram showing the structure of a cassette cartridge according to the embodiment of the present invention. FIG. 4 shows the state that a magnetic tape 91 has been fully rewound. The cassette cartridge 200 has a supply reel 201 and a takeup reel 202. The magnetic tape 91 supplied from the supply reel 201 is rewound by the takeup reel 202 through guide posts 203 and 204 that are disposed for example as shown in FIG. 4. When the cassette cartridge 200 is attached to the recording/reproducing apparatus 100, the magnetic tape 91 is pulled out between the guide posts 203 and 204 by a predetermined mechanism. The pulled magnetic tape is wound to a rotating head (that will be described later) with a predetermined winding angle against thereto.

Figure 5:
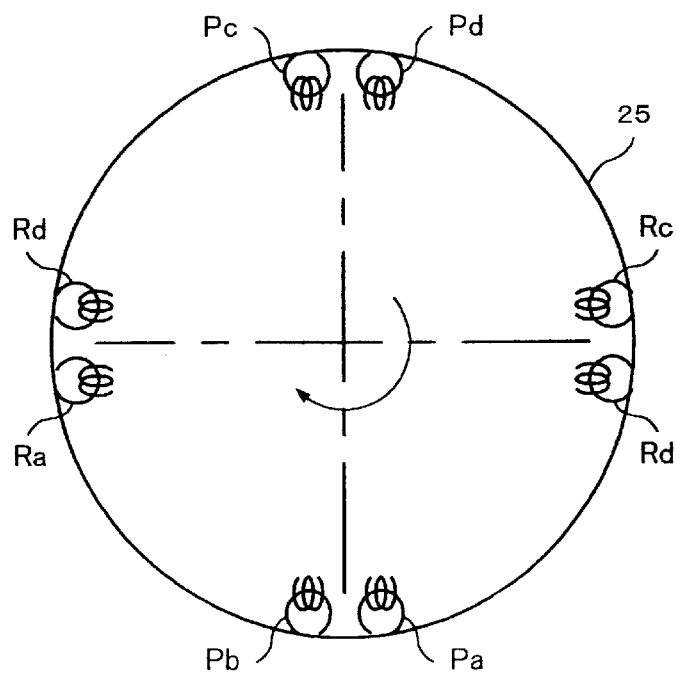
FIG. 5 is a schematic diagram showing an example of the arrangement of heads of a recorder portion.

Data is recorded and reproduced to and from the magnetic tape 91 by a rotating head of which recording heads and reproducing heads are disposed on a rotating drum. FIG. 5 shows an example of the arrangement of heads of the recorder portion 2. Referring to FIG. 5, four recording heads Ra, Rb, Rc, and Rd and four reproducing (playback) heads Pa, Pb, Pc, and Pd are disposed on a drum 25 that rotates at a predetermined speed.

The heads Ra and Rb are disposed at adjacent positions. The heads Rc and Rd are disposed at adjacent positions. The heads Pa and Pb are disposed at adjacent position. The heads Pc and Pd are disposed at adjacent positions. The extended direction (azimuth) of one of two adjacent heads is different from that of the other. The heads Ra and Rc are oppositely disposed at an interval of 180°. The heads Ra and Rc have a first azimuth. Likewise, the heads Rb and Rd are oppositely disposed at an interval of 180°. The heads Rb and Rc have a second azimuth. In addition, the heads Pa and Pc have the first azimuth. The heads Pb and Pd have the second azimuth. With the different azimuths, a crosstalk can be prevented from taking place between adjacent tracks. Adjacent two heads are actually accomplished as an integrated head portion referred to as a double-azimuth head.

A tape 91 pulled out from a cassette cartridge 200 is slantingly wound around the drum 25 with an angle of slightly larger than 180°. The tape 91 has for example a width of ½ inch. The tape 91 is traveled at predetermined speed. Thus, when data is recorded on the tape 91, in the first half turn of the drum 25, the heads Ra and Rb scan the tape 91. In the second half turn of the drum 25, the heads Rc and Rd scan the tape 91. When data is reproduced, in the first half turn of the drum 25, the heads Pa and Pb scan the tape 91. In the second half turn of the drum 25, the heads Pc and Pd scan the tape 91.

Figure 6:
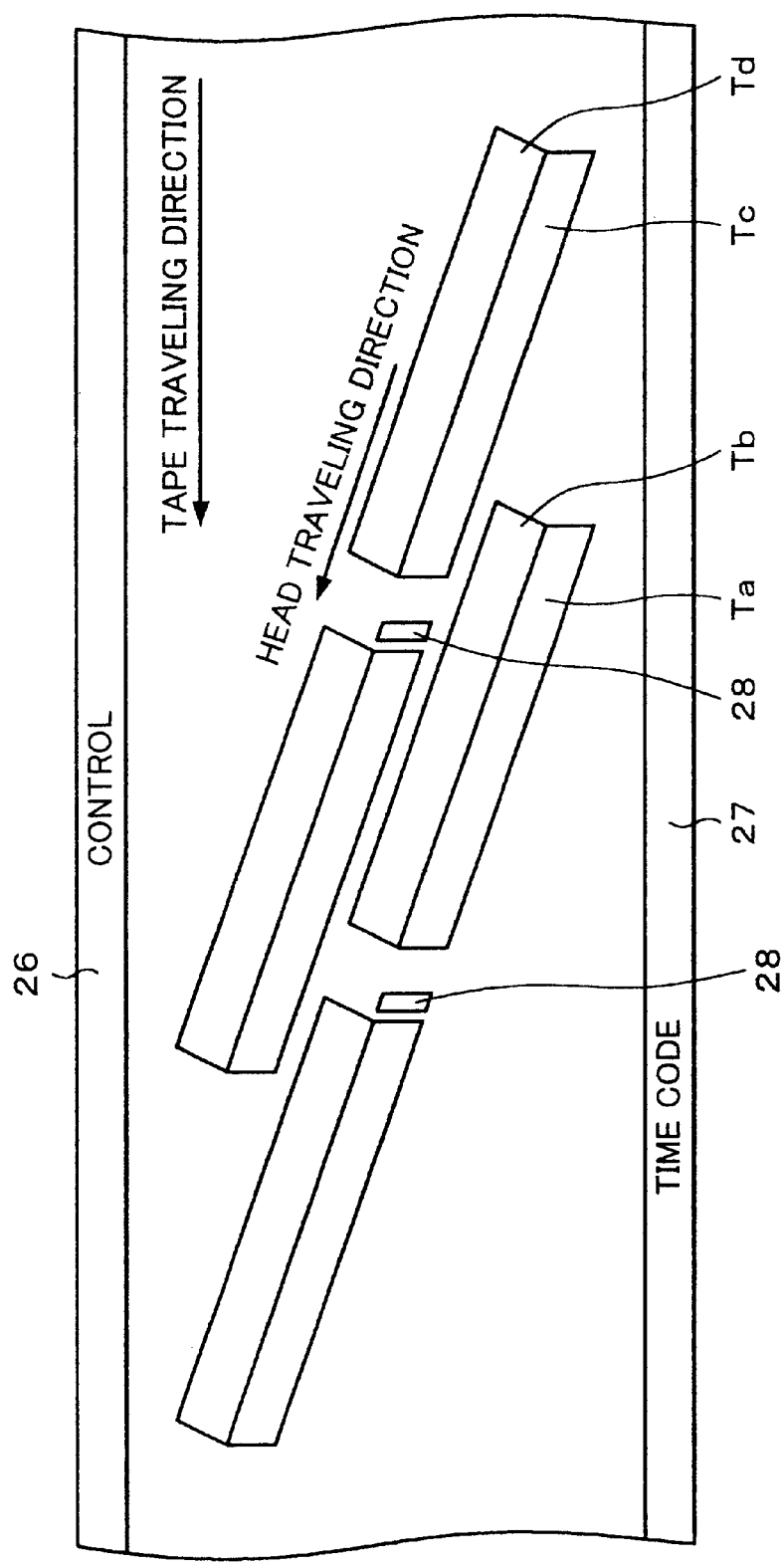
FIG. 6 is a schematic diagram showing a track pattern on a tape of the recorder portion.

FIG. 6 shows a track pattern on the tape 91. Two longitudinal tracks are formed on the upper and lower portions in the width direction of the tape. Between the upper and lower longitudinal tracks, helical tracks are formed. A control signal is recorded on the upper longitudinal track 26. Information that represents the position in the longitudinal direction of the tape is recorded on the lower longitudinal track 27. For example, SMPTE time code may be used.

When the drum 25 is turned once, the heads Ra and Rb simultaneously form two helical tracks Ta and Tb, respectively. Thereafter, the heads Rc and Rd simultaneously form two helical tracks Tc and Td, respectively. Each helical track is separated into a first half portion and a second half portion. A record area 28 for a tracking pilot signal is formed between the first half portion and the second half portion.

The SMPTE time code has been developed for a video signal for a VTR and so forth. The minimum unit of the SMPTE time code is a frame (1/30 seconds). As will be described later, each tape drive uses the SMPTE time code as a data unit for the four tracks Ta to Td shown in FIG. 6 (the data unit is referred to as track set). When one frame of a video signal corresponds to 16 tracks, with a lower digit (values 0, 1, 2, and 3) of the frame digit of the time code, a time code with a unit of a track set (this time set may be referred to as ID) should be used. When the SMPTE time code is used, since the user data area is provided, such a modification is available.

In the above-described example, the SMPTE time code is used as information that represents the position in the longitudinal direction of the tape 91. However, it should be noted that the present invention is not limited to such an example.

Figure 7:
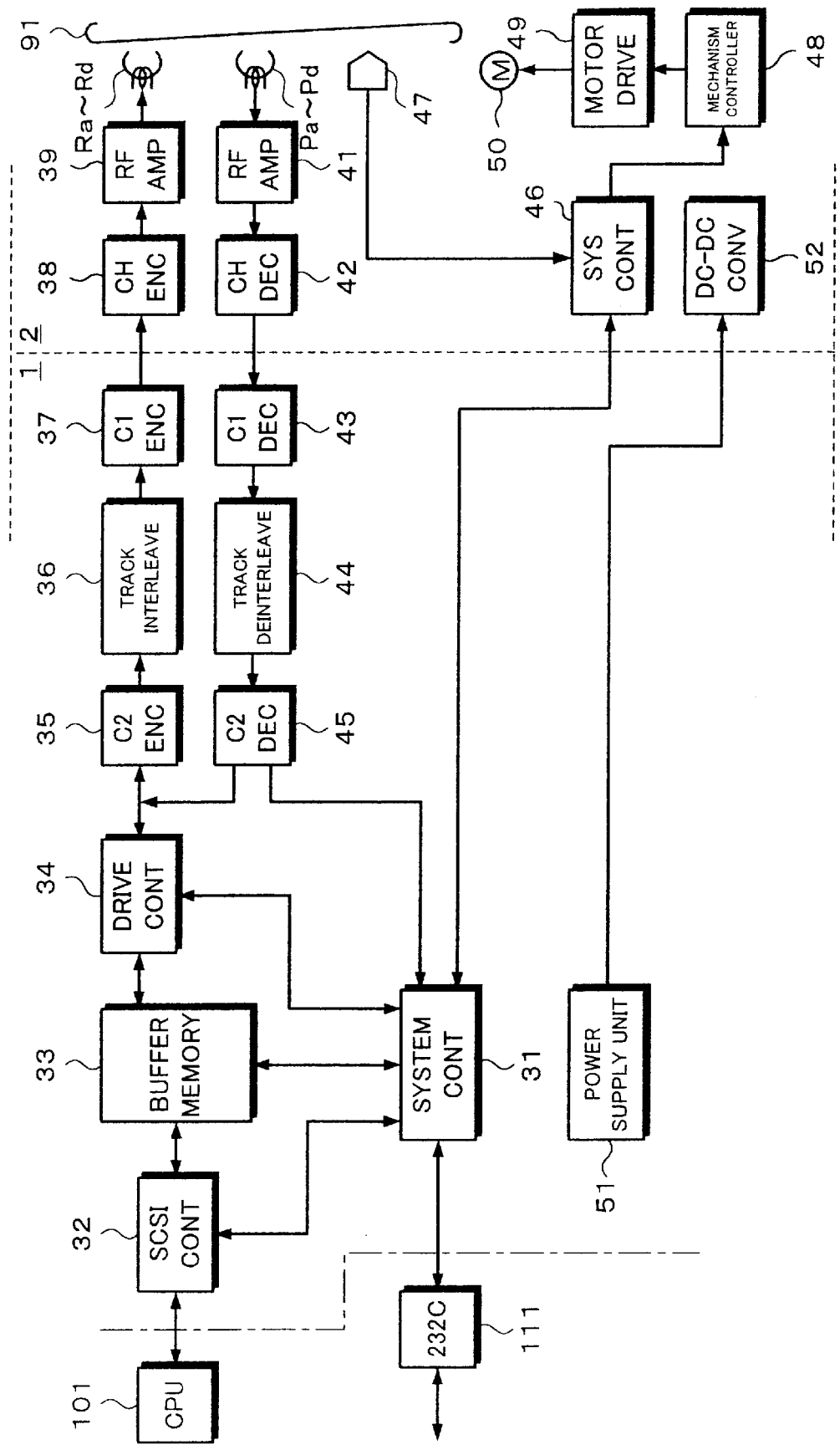
FIG. 7 is a block diagram showing the system structure of a controlling portion and the recorder portion.

FIG. 7 is a block diagram showing the system structure of a tape drive composed of the controlling portion 1 and the recorder portion 2. The tape drive is connected to the CPU 101 through a SCSI controller 32 of the controller portion 1. In addition, the tape driver is connected to the CPU 101 through the RS-232C interface 111 by a system controller 31 of the controller portion 1.

When data is recorded, a record command that is supplied from the CPU 101 and record data recorded on the tape 91 are input to the SCSI controller 32. The SCSI controller 32 separates the input data into the command and the record data. The separated record data is stored to a buffer memory 33. On the other hand, the separated command is supplied to the system controller 31. The record data that is stored to the buffer memory 33 is read at a read timing controlled by the system controller 31. The record data is supplied to a C2 encoder 35 through a drive controller 34. The record data that is output from the C2 encoder 35 is input to a C1 encoder 37 through a track interleaving circuit 36.

The C2 encoder 35 and the C1 encoder 37 perform an error correction code encoding process for record data using a product code. The track interleaving circuit 36 controls data that are recorded on tracks so as to improve the error correcting capability in the recording/reproducing process.

When data is recorded on a tape, the data is segmented into SYNC blocks each of which is delimited with a synchronous signal. Thus, the track interleaving circuit 36 adds a block synchronous signal. The C1 encoder 37 generates a C1 parity, randomizes data, and interleaves words in a plurality of SYNC blocks.

The C1 encoder 37 supplies digital data to the recorder portion 2. In the recorder portion 2, a channel code encoder 38 encodes digital data received from the C1 encoder 37. The encoded data is supplied from the channel code encoder 38 to the recording heads Ra to Rd through an RF amplifier 39. The recording heads Ra to Rd record data to a tape 91. The RF amplifier 39 performs a process corresponding to partial response class 4 (PR (1, 0, −1)) for encoded data received from the channel code encoder 38.

When data is reproduced, the CPU 101 outputs a command that causes predetermined data to be read from the tape 91. The command is supplied to the system controller 31 through the SCSI controller 32. The system controller 31 sends a control signal to a system controller 46 (that will be described later) corresponding to the supplied command, causes the tape 91 to be traveled to a predetermined position, and causes data to be reproduced.

A reproduction signal reproduced from the tape 91 by the reproducing heads Pa to Pd is supplied to a channel code decoder 42 through an RF amplifier 41. The channel code decoder 42 converts the reproduction signal into digital reproduction data. The RE amplifier 41 has a reproducing amplifier, an equalizer, a Viterbi decoder, and so forth. Decoded data is supplied from the channel code decoder 42 to a C1 decoder 43 of the controlling portion 1.

The C1 decoder 43 is connected to a track deinterleaving circuit 44. A C2 decoder 45 is connected to the deinterleaving circuit 44. The C1 decoder 43, the track deinterleaving circuit 44, and the C2 decoder 45 perform inverse processes of the C1 encoder 37, the track interleaving circuit 36, and the C2 encoder 35, respectively. The C2 decoder 45 supplies reproduced (read) data to the buffer memory 33 through the driver controller 34. In addition, the C2 decoder 45 determines whether or not the reproduction (read) data is different from the record data. When the reproduction data is different from the record data, the C2 decoder 45 supplies a correction disable error signal to the system controller 31.

The system controller 31 controls each portion of the controlling portion 1. For example, the C2 encoder 35, the track interleaving circuit 36, the C1 encoder 37, the C1 decoder 43, the track deinterleaving circuit 44, and the C2 decoder 45 are controlled with control signals (not shown) received from the system controller 31. In addition, the system controller 31 accesses and controls the buffer memory 33. Moreover, the system controller 31 exchanges commands and data with the system controller 46 (that will be described later).

When various buttons (not shown) of the controlling portion 1 are operated, control signals assigned to functions corresponding to the operations of the buttons are supplied to the system controller 31. Thus, various operations of the tape drive can be controlled.

The recorder portion 2 has a system controller 46 and a fixed head 47. The fixed head 47 scans a longitudinal track of the tape 91. The fixed head 47 is connected to the system controller 46. The fixed head 47 records and reproduces a control signal and a time code. The system controller 46 is connected to the system controller 31 of the controlling portion 1 through a bidirectional bus. The system controller 31 determines whether data recorded or reproduced is error uncorrectable data.

A mechanism controller 48 is connected to the system controller 46. The mechanism controller 48 includes a servo circuit. The servo circuit drives a motor 50 through a motor drive circuit 49. The system controller 46 has for example two CPUs that communicate with the controlling portion 1, control the recording/reproducing operations of a time code, and control the timings of the recording/reproducing operations of data.

The mechanism controller 48 has for example two CPUs that control a mechanical system of the recorder portion 2. In reality, the mechanism controller 48 controls the rotation of the head/tape system, the tape speed, the tracking operation, the loading/unloading operations of a cassette tape, and the tape tension. The motor 50 represents a drum motor, a capstan motor, a reel motor, a cassette attaching motor, a loading motor, and so forth.

For example, as described above, a control signal corresponding to the reproduction command that is output from the CPU 101 is supplied from the system controller 31 to the system controller 46. The system controller 46 obtains the current position of the tape 91 with the reproduction signal supplied from the fixed head 47 and sends a control signal to the mechanism controller 48. The mechanism controller 48 controls the motor drive 49 corresponding to the supplied control signal, drives the motor 50, and drives and controls the traveling of the tape 91.

The recorder portion 2 also has a DC-DC converting circuit 52. A DC voltage is supplied from a power supply unit 51 of the controlling portion 1 to the DC-DC converting circuit 52. The recorder portion 2 also has position sensors (such as a tape end detecting sensor), a time code generating/reading circuit, and so forth (not shown in FIG. 7). Output signals of the position sensors and the time code generating/reading circuit are supplied to the system controller 46.

Figure 8:
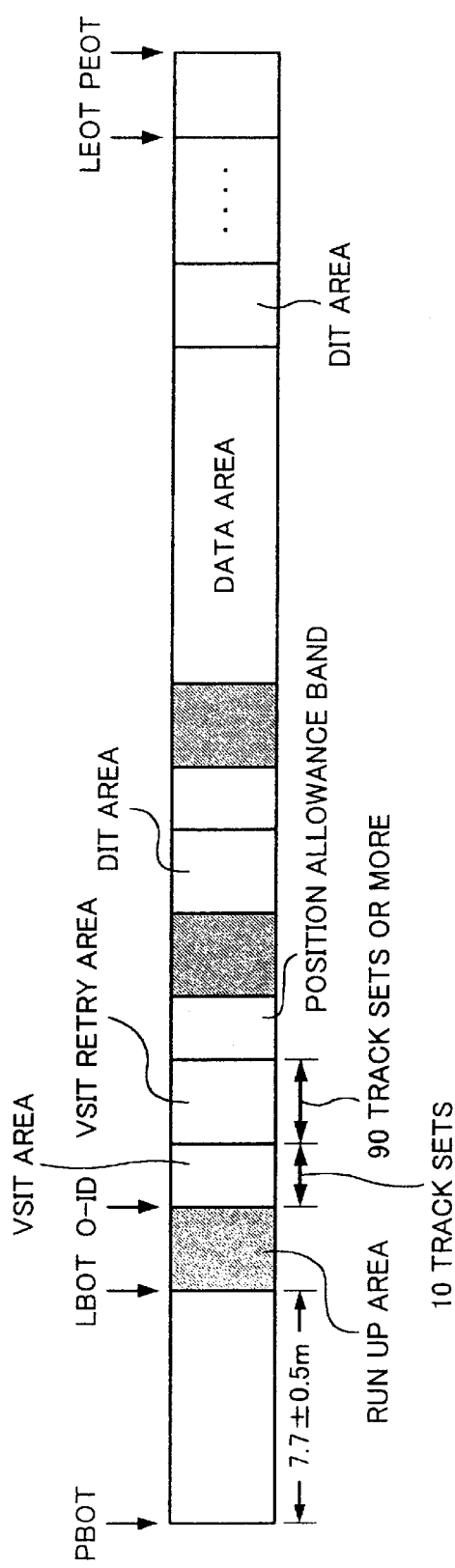
FIG. 8 is a schematic diagram showing an example of the overall layout of a tape.

Next, the tape record format of digital data will be described. FIG. 8 shows a layout of a tape (for example, a tape housed in one cartridge). The tape is a physical volume. Leader tapes are connected at the beginning end and the last end of the tape. The beginning end of the physical volume is referred to as PBOT (Physical Beginning of Tape). The last end of the physical volume is referred to as PEOT (Physical End of Tape). In the physical volume, there is a recordable area. The beginning end of the recordable area is referred to as LBOT (Logical Beginning of Tape). The last end of the recordable area is referred to as LEOT (Logical End of Tape). Since the tape is easily damaged at the beginning end and the last end, their error rate is high. The area between PBOT and LBOT is referred to as invalid area that is for example 7.7±0.5 m. Likewise, the area between PEOT and PEOT is referred to as invalid area that is for example 10 m or longer.

A logical volume is contained in one physical volume. VSIT (Volume Set Information Table) that is management information for managing the logical volume is recorded at the beginning of the record area. VSIT starts at 0ID. ID (Identification) is an address assigned to each set of four tracks corresponding to a tape position. The ID number simply increases from the VSIT area to the DIT area of the last end of the logical volume. The length of one VSIT is 1ID.

The logical volume is composed of DIT (Directory Information Table), UIT, and user data area. The DIT has information for managing files in the logical volume. The length of one DIT is 40ID. The DIT is placed at the beginning end and the last end of the logical volume.

The UIT is optional user information for managing files.

In FIG. 8, hatched areas are run-up areas. With the run-up areas, data tracks are servo-locked. Dotted areas are position allowance bands. With the position allowance bands, when VSIT and DIT are updated, valid data can be prevented from being erased.

Figure 9A:
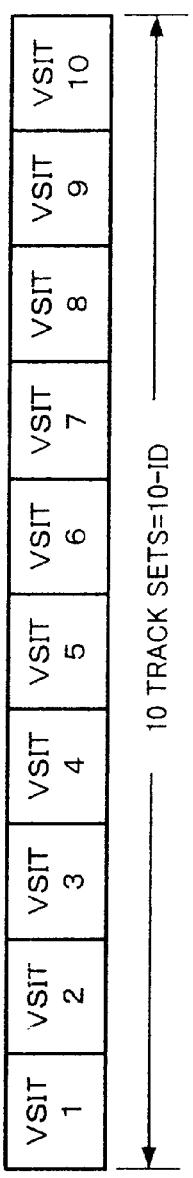
FIGS. 9A, 9B and 9C are schematic diagrams for explaining VSIT and DIT.

As shown in FIG. 9A, VSIT is repeatedly recorded ten times so as to improve the reliability of data. Thus, the VSIT area is composed of 10 track sets (=10-ID). The VSIT area is followed by a retry area of 90 track sets or more.

Figure 9B:
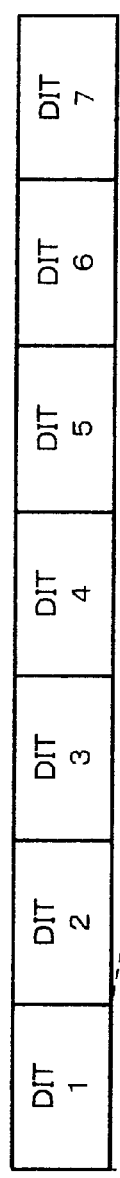
Figure 9C:
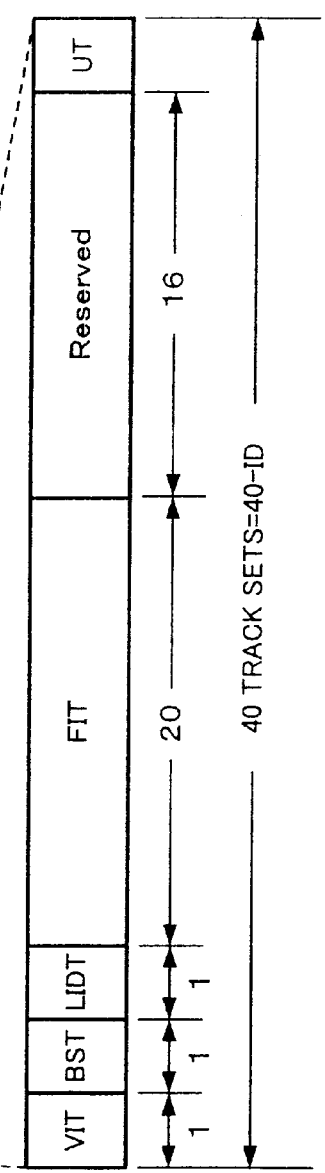

As shown in FIG. 9B, to improve the reliability of data, DIT is repeatedly recorded seven times. As shown in FIG. 9C, DIT is composed of six tables that are VIT (Volume Information Table), BST (Bad Spot Table), LIDT (Logical ID Table), FIT (File Information Table), UT (Update Table), and UIT (User Information Table) successively placed in the order. The length of each of VIT, BST, LIDT, and UT is 1-ID. The length of FIT is 20-ID. The remaining area of 16-ID is reserved.

Next, each table of DIT will be described. The ID address of VIT is the beginning physical ID of the volume written in VSIT. The logical ID of VIT is equal to the beginning physical ID written in VSIT. VIT contains volume information such as a volume label, the beginning physical ID of the first data block of the physical volume, and the last physical ID.

Figure 10:
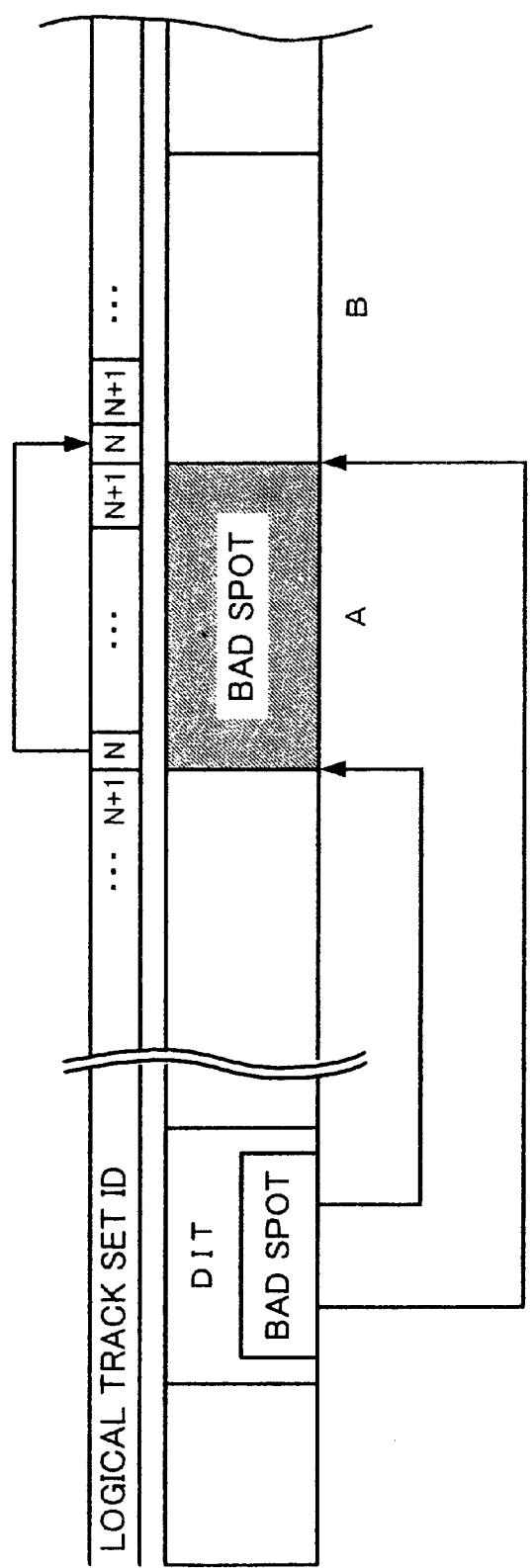
FIG. 10 is a schematic diagram for explaining a bad spot.

The ID address of BST is the physical ID of VIT plus 1. The logical ID of BST is the logical ID of VIT plus 1. BST has position information of logically invalid data. The logically invalid data is data that should be treated invalid because data with the same track set ID is written later. For example, as shown in FIG. 10, a hatched area A is logically invalid data. A write retry process and a writing process performed thereafter result in logically invalid data. When a writing process results in an error, a write retry process is automatically performed and an error location is output. The error location is registered to BST. When a reading process is performed, BST represents the invalid area. The logically invalid data is also referred to as bad spot. With BST, beginning physical ID and end physical ID of up to 14592 bad spots can be managed.

The ID address of LIDT is the physical ID of VIT plus 2. The logical ID of LIDT is the logical ID of VIT plus 2. LIDT is a data table for a high speed block space and a locating operation. In other words, LIDT contains the first block number of a block management table of logical ID, physical ID, file number, and ID data of each of pointers 1 to 296.

The ID address of FIT is the physical ID of VIT plus 3. The logical ID of FIT is the logical ID of VIT plus 3. FIT is composed of a plurality of pairs of two pieces of data corresponding to a tape mark. The tape mark is a file delimiter code. The N-th data pair corresponds to the N-th tape mark counted from the beginning of the volume. The first pair member is the physical ID of the N-th tape mark. The second pair member is the absolute block number of the N-th tape mark that is the absolute block number of the last block with the same file number as the tape mark. With the physical ID of a tape mark and the absolute block number, the position of the tape mark can be accurately obtained. Thus, the physical position of the tape can be accessed at high speed.

The ID address of UT is the physical ID of VIT plus 39. UT is information that represents whether or not the volume has been updated. Before the volume is updated, a word (four bytes) that represents an update status in UT is FFFFFFFFh (where h represents hexadecimal notation). After the volume is updated, the word is 00000000h.

UIT is an optional area that is a user-accessible data table. The length of UIT is for example 100-ID. UIT is used for a user header.

Figure 11:
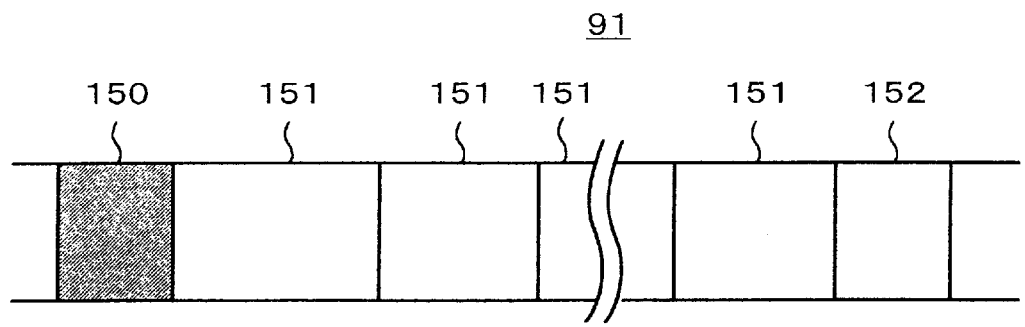
FIG. 11 is a schematic diagram showing an example of the format of a data area.

FIG. 11 shows an example of the format of the data area. Each volume is largely divided into a volume label portion and a batch file portion. The volume label portion is used to identify the volume. The batch file portion is used to record a real bit file and user data. Referring to FIG. 11, an area 150 on the beginning end side of a tape 91 is referred to as beginning end volume label area. The beginning end volume label area 150 contains information of the volume created/updated time, the volume name, the volume ID, and so forth.

The beginning end volume label area 150 is followed by a batch file area 151. A plurality of batch file areas 151 may be successively placed. The last batch file area 151 is followed by a last end volume label area 152 that is a sub volume label against the beginning end volume label. The last end volume label area 152 contains the same information as the beginning end volume label area 150.

Figure 12:
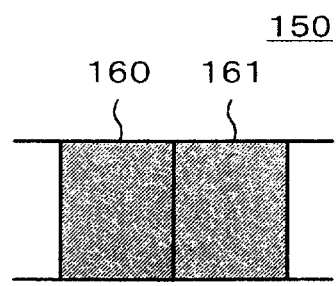
FIG. 12 is a schematic diagram showing an example of the structure of a volume label area.

As shown in FIG. 12, the beginning end volume label area 150 is composed of two label areas 160 and 161. Effective information for identifying a volume is for example:

magic number, time of creation, time of expiration, record size, volume ID, and volume name.

Next, such values will be exemplified. The "magic number" is a fixed value for defining a data format. The "time of creation" is the time at which the volume label of the volume was created. The "time of expiration" and "record size" are both fixed values. The "volume ID" is an ID assigned to the volume. In this example, the time at which the volume was created (namely, the "volume ID") is the same as the "time of creation". The "volume name" is composed of a character string of up to 24 characters given by for example the user.

The "volume name" is created with an ID represented with a bar code placed on the cassette cartridge 200. In other words, when the cassette cartridge 200 is initially used, a volume label has not been formed on the tape 91. On the other hand, a bar code that represents a unique ID given by the user has been placed on the cassette cartridge 200. When the cassette cartridge 200 is initially used, the ID is read from the bar code and used as a volume name.

The label area 161 contains owner information of the volume and version information of the label.

Figure 13:
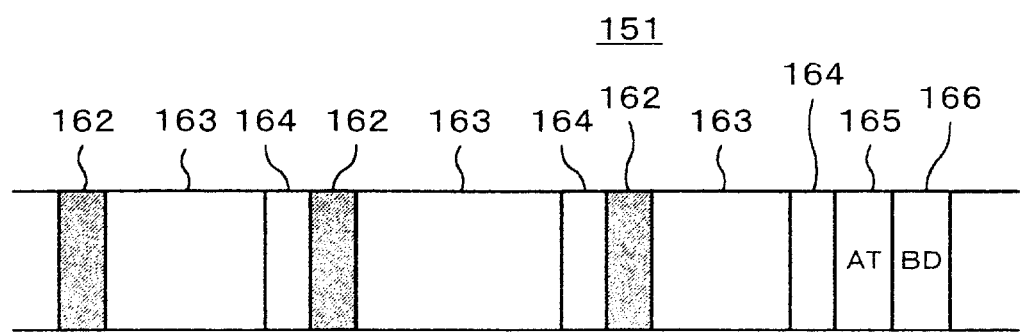
FIG. 13 is a schematic diagram showing an example of the structure of a batch file area.

FIG. 13 shows an example of the structure of a batch file area 151. In the batch file area 151, a bit file area 163 that is real data is preceded by a header area 162 and followed by a trailer area 164. At least one set of the header area 162, the bit file area 163, and the trailer area 164 is placed. The last trailer area 164 is followed by an archive trailer area 165. In addition, to cause the overall data size of the batch file area 151 to be limited, the archive trailer area 165 is followed by a no-data area (boundary) 166.

The header area 162 contains the ID of the bit file area 163. The header area 162 is followed by the bit file area 163. The trailer area 164 contains the path of the file. The archive trailer area 165 contains a predetermined keyword as a delimiter of one archive. The archive trailer area 165 represents the end of one batch file.

When a cassette cartridge is attached to the tape drive of the recording/reproducing apparatus 100, a DIT that has been described is read from the tape 91. Thereafter, the loading process is performed. After the loading process is completed, the volume 106 can be accessed by the CPU 101 and then the volume label is read. Thereafter, it is determined whether or not the loaded volume 106 is a desired volume corresponding to the volume label that has been read. After the determination of the loaded volume 106 has been performed, the volume 106 is mounted to the system. Consequently, the volume 106 can be used for the file system. Thus, the client can use the volume 106.

Next, with reference to a flow chart shown in FIG. 14, an example of the mounting process of the recording/reproducing apparatus 100 for the volume 106 will be described. This process is started when the client issues an access request for particular data to the recording/reproducing apparatus 100.

Figure 14:
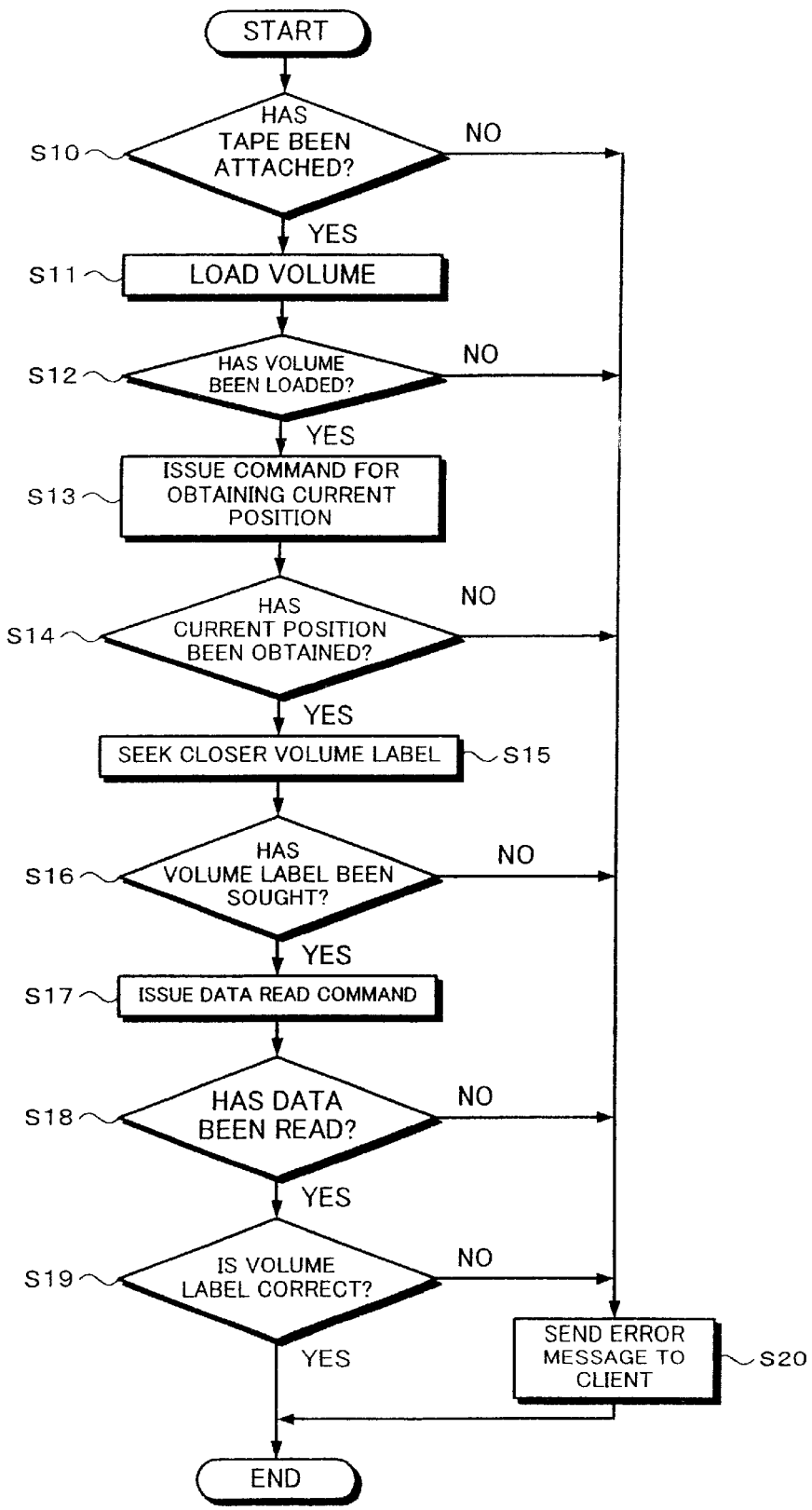
FIG. 14 is a flow chart showing an example of a mounting process for a volume.
Figure 15:
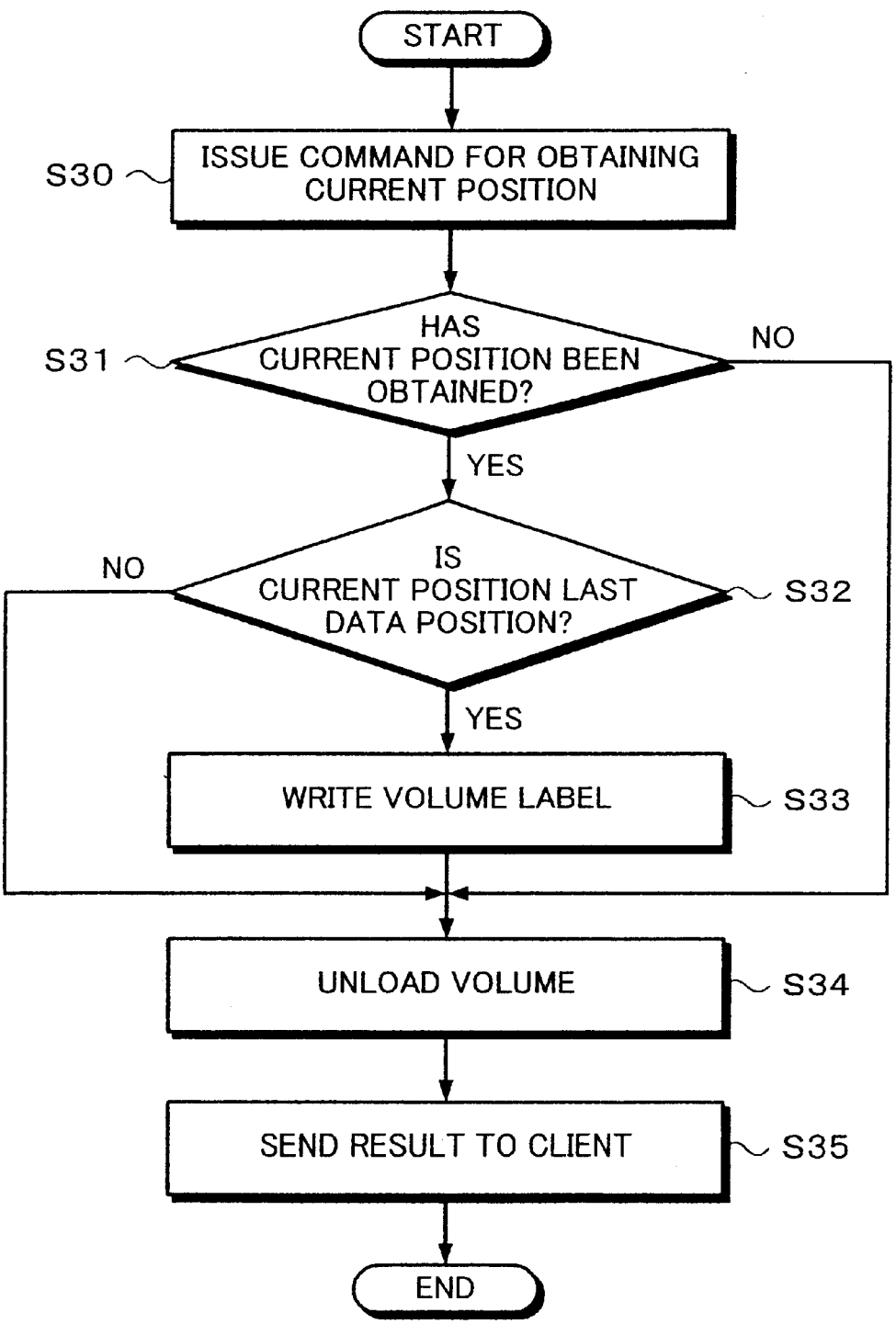
FIG. 15 is a flow chart showing an example of an unmounting process for a volume.

Each step of the processes on the flow charts shown in FIGS. 14 and 15 is performed by exchanging a command for executing a particular operation and a status that represents an executed result thereof between the recording/reproducing apparatus 100 and the CPU 101 (when necessary, among the recording/reproducing apparatus 100, the CPU 101, and the client).

Before the process shown in FIG. 14 is performed, in the system as shown in FIG. 3, the client issues a request for accessing particular data in many cassette cartridges accommodated in a bin (not shown) of the recording/reproducing apparatus 100. In addition, the library information database of the CPU 101 is searched for a relevant volume 106 of the many volumes 106 accommodated in the bin corresponding to the data requested by the client.

Corresponding to the searched result, a conveying mechanism (not shown) of the recording/reproducing apparatus 100 automatically searches the relevant volume 106. For example, a bar code reader (not shown) scans bar codes placed on cassette cartridges and determines whether the value of each bar code match the particular volume 106. When the relevant cassette cartridge is detected, the conveying mechanism automatically attaches the cassette cartridge to a relevant tape drive. The information of the bar code placed on the loaded cassette cartridge is stored in for example a memory (not shown) of the system controller 31.

At step S10, in the recording/reproducing apparatus 100, it is determined whether or not a tape (namely, a cassette cartridge) has been attached to the drive. For example, it is determined whether or not the cassette cartridge has been placed at the predetermined position of the drive portion 2 corresponding to the detected result of a cassette position sensor (not shown) disposed in for example the drive portion 2. When the cassette cartridge has not been attached to the drive (namely, the determined result at step S10 is No), the flow advances to step S20. At step S20, an error message (that represents that the cassette cartridge has not been attached to the drive) is issued to the client.

On the other hand, when the cassette cartridge has been attached to the relevant tape drive (namely, the determined result at step S10 is Yes), the flow advances to step S11. At step S11, the attached cassette cartridge is loaded corresponding to a command received from the CPU 101. Thus, the volume 106 is loaded. In this case, the CPU 101 outputs to the recording/reproducing apparatus 101 a command for loading the volume 106. Corresponding to the command, the cassette cartridge is placed at the predetermined position of the tape drive under the control of the system controller 46. With the loading mechanism, the tape is pulled out from the cassette cartridge. The tape is wound around the drum 25 with a predetermined winding angle through a predetermined tape path. Thereafter, the tape and the drum 25 are driven and a DIT is read from the tape. The DIT that has been read from the tape is stored to for example a memory of the system controller 31.

According to the embodiment of the present invention, as was described above, a total of two DITs are placed at the beginning end portion and the last end portion of the data area. At step S11, corresponding to a command received from the CPU 101, depending on the tape position that has been pulled out from the cassette cartridge and wound around the rotating head, one of two DITs is read whichever closer to the current tape position. For example, tape position information recorded on the longitudinal track 27 is read by the fixed head 47. The tape position information that has been read is supplied to the system controller 31 through the system controller 46. On the other hand, the library information database of the CPU 101 stores the position information of DITs of each volume. Corresponding to both the position information of the DITs of the relevant volume stored in the database and the positon information that has been read from the longitudinal track 27, the system controller 31 selects one of two DITs. The system controller 31 sends the selected DIT information to the system controller 46. The system controller 46 controls each circuit portion so as to seek the selected DIT position of the tape and read the DIT.

By reading the DIT, the volume 106 is loaded. Thus, the CPU 101 can write data to the volume 106. In addition, the CPU 101 can read data from the volume 106. At step S12, in the recording/reproducing apparatus 100, it is determined whether or not the volume 106 has been loaded. When the volume has not been loaded (namely, the determined result at step S12 is No), the flow advances to step S20. At step S20, an error message (that represents that the volume 106 has not been loaded) is issued to the client.

On the other hand, when the volume 106 has been loaded (namely, the determined result at step S12 is Yes), the flow advances to step S13. At step S13, the CPU 101 issues a command for obtaining the current seek position of the volume 106 (hereinafter, referred to as "current position of volume 106") to the recording/reproducing apparatus 100. When the recording/reproducing apparatus 100 receives the command from the CPU 101, the recording/reproducing apparatus 100 reads for example the longitudinal track 27 of the tape and obtains the current position of the volume 106.

At step S14, in the recording/reproducing apparatus 100, it is determined whether or not the current position of the volume 106 has been obtained. When the current position of the volume 106 has not been obtained (namely, the determined result at step S14 is No), the flow advances to step S20. At step S20, an error message (that represents that the current position of the volume 106 has not been obtained) is issued to the client.

On the other hand, when the current position of the volume 106 has been obtained (namely, the determined result at step S14 is Yes), relevant information is sent to the CPU 101. Thereafter, at step S15, the CPU 101 issues a command for seeking the volume 106 for one of the beginning end volume label 150 and the last end volume label 152 whichever closer to the obtained current position. Corresponding to the command, the recording/reproducing apparatus 100 seeks the volume 106. As described above, each DIT contains VIT that is a table having volume label information. With reference to the VIT contained in the DIT that has been read in the volume loading process, the tape 91 is sought for a volume label closer to the current position.

The position information of the volume label of each volume can be stored to the library information database of the CPU 101. Corresponding to both the position information obtained from the library information database and the position information recorded on the longitudinal track 27, the tape 91 may be sought to one of the volume labels 150 and 152 whichever closer to the current position.

At step S16, in the recording/reproducing apparatus 100, it is determined whether or not the tape 91 has been sought for the position of a volume label. This determination is performed by collating the ID of the time code that is read from the longitudinal track 27 of the tape 91 by the fixed head 47 with the position information of the volume label recorded in the DIT. When the tape 91 has not been sought for the position of the volume label (namely, the determined result at step S16 is No), the flow advances to step S20. At step S20, an error message (that represent that the tape 91 has not been sought for the position of the volume label) is issued to the client.

On the other hand, when the tape 91 has been sought for the position of the volume label (namely, the determined result at step S16 is Yes), the flow advances to step S17. At step S17, the CPU 101 issues to the recording/reproducing apparatus 100 a command for reading the volume label at the sought position. Corresponding to the command, in the recording/reproducing apparatus 100, the volume label is read. At step S18, it is determined whether or not the volume label has been read. When the volume label has not been read (namely, the determined result at step S18 is No), the flow advances to step S20. At step S20, an error message (that represents that the volume label has not been read) is issued to the client.

On the other hand, when the volume label has been read (namely, the determined result at step S18 is Yes), the flow advances to step S19. The volume label that has been read is stored in for example a memory (not shown) of the system controller 31.

At step S19, it is determined whether or not the volume label that has been read is an expected volume label so as to verify the volume 106. In other words, in the recording/reproducing apparatus 100, it is determined whether or not information of the volume label that has been read matches the relevant volume 106 that records data requested by the client. The determination is performed by collating the information of the bar code of the cassette cartridge in which the volume 106 is housed with the volume label that has been read with reference to a memory (not shown) of the system controller 31. When the volume label that has been read does not match the expected volume label (namely, the determined result at step S19 is No), the flow advances to step S20. At step S20, an error message (that represents that the volume label that has been read does not match the expected volume label) is issued to the client.

On the other hand, when the volume label that has been read matches the expected volume label (namely, the determined result at step S19 is Yes), the volume 106 that has been read is mounted to the system. Thus, the mounting process is successfully completed.

Next, an unmounting process for canceling the mount state of the volume 106 will be described. FIG. 15 is a flow chart showing the unmounting process according to the present invention. The unmounting process is started when the client issues to the CPU 101 a command for unmounting a volume 106 that has been mounted thereto.

First of all, the CPU 101 issues to the recoding/reproducing apparatus 100 a command for obtaining the current position of the volume 106. When the recording/reproducing apparatus 100 receives the command, the recording/reproducing apparatus 100 reads the position information of for example the longitudinal track 27 of the volume 106 and obtains the information of the current positon. At step S31, in the recording/reproducing apparatus 100, it is determined whether or not the information of the current position of the volume 106 has been obtained. When the information of the current position has not been obtained (namely, the determined result at step S31 is No), the flow advances to step S34.

On the other hand, when the information of the current position has been obtained (namely, the determined result at step S31 is Yes), the flow advances to step S32. At step S32, in the recording/reproducing apparatus 100, it is determined whether or not the current position of the volume 100 is the last position of the data. This determination may be performed by the CPU 101. When the current position is not the last position (namely, the determined result at step S32 is No), the flow advances to step S34.

On the other hand, when the current positon of the volume 106 is the last position of the data (namely, the determined result at step S32 is Yes), the flow advances to step S33. At step S33, the volume label is written after the last data. Thus, the last end volume label area 152 is formed. The same volume label as the beginning end volume label area 151 is written to the last end volume label area 152.

The volume label is created as data by the client or the CPU 101. The volume label is supplied to the recording/reproducing apparatus 100 through the CPU 101. In the recording/reproducing apparatus 100, the volume label is stored to the buffer memory 33. The volume label written to the buffer memory is recorded as data to the volume 106 as with the data recording process. After the volume label has been written, the flow advances to step S34. When the volume label has not been successfully written, an error message (that represents that the volume label has not been successfully written) is issued from the recording/reproducing apparatus 100 to the client.

At step S34, the volume 106 is unloaded. In the unloading process, the recording/reproducing apparatus 100 writes a DIT to the tape. In this case, the volume 106 is sought for one of two positions of the beginning end portion and the last end portion of the data area whichever closer to the current positon. At the sought position, the DIT is written. Thereafter, the tape (namely, the cassette cartridge) is ejected from the drive portion 2. For example, the tape is removed from the drum 25, returned from the tape path, and housed to the cassette. Thereafter, the tape is detached from the tape drive. The detached tape is automatically returned to a relevant bin. In addition, the CPU 101 updates relevant data of the library information database. For example, when the volume label has been written after the last data at step S33, the position information is updated. In addition, for example, the sought position just before the unloading process is performed is updated.

After the unloading process for the volume 106 is completed, the flow advances to step S35. The result of the unloading process is sent from the recording/reproducing apparatus 100 to the client. When an error takes place during the unloading process (for example, (for example, the determined result at step S31 is No and the flow advances to step S34, skipping steps S32 and S33), an error message (that represents an error has taken place) is issued to the client.

In the above-described example, the present invention is applied to a single partition system of which one logical volume is contained in a physical volume. However, it should be noted that the present invention is not limited to such an example. In other words, the present invention can be applied to a multi-partition system. When the present invention is applied to the multi-partition system, it is required that the logical volume should not be moved.

As described above, according to the present invention, since the same volume labels are placed at two positions that are the beginning end position and the last end position of one volume, when the volume is mounted, the volume is sought for a volume label closer to the current position. Thus, the volume mount time becomes short.

In addition, since the same volume labels are placed at the beginning end position and the last end position of one volume, even if one of them cannot be read due to any cause, the other volume label can be read so as to mount the volume. Thus, the reliability of the medium can be improved.

What is claimed is:

1. A method of mounting a volume from a tape medium, comprising the steps of:

reading a bar-code indicating the volume from a tape cartridge;

attaching the tape cartridge to a tape drive and reading a Directory Information Table (DIT) recorded on the tape medium of said tape cartridge, thereby loading the tape cartridge on the tape drive;

detecting a current track position on the tape medium on the basis of a longitudinal track;

determining whether a beginning volume label or a last used area volume label is nearer to the current track position;

reading the nearer volume label from the tape medium;

confirming the volume by comparing the nearer volume label with the bar-code; and mounting the volume onto the tape drive.

2. The method according to claim 1, further comprising the step of requesting said volume from a plurality of volumes stored in a tape medium bin containing a plurality of tape cartridges.

3. The method according to claim 2, further comprising the step of selecting the tape cartridge from said tape medium bin on the basis of the bar-code.

4. An apparatus for mounting a volume from a tape medium, comprising:

means for reading a bar-code indicating-the volume from a tape cartridge;

means for attaching the tape cartridge to a tape driving means;

said tape driving means reading a Directory Information Table (DIT) recorded on the tape medium of said tape cartridge; thereby loading the tape cartridge; and said tape driving means detecting a current track position on the tape medium on the basis of a longitudinal track; determining whether a beginning volume label or a last used area volume label is nearer to the current track position; reading the nearer volume label from the tape medium; confirming the volume by comparing the nearer volume label with the bar-code; and mounting the volume onto the tape driving means.

5. The apparatus according to claim 4, wherein said tape drive means comprises a plurality of tape drives.

6. The apparatus according to claim 4, further comprising means for requesting said volume from a plurality of volumes stored in a tape medium bin containing a plurality of tape cartridges.

7. The apparatus according to claim 6, further comprising means for selecting the tape cartridge from said tape medium bin on the basis of the bar-code.

8. A tape drive system for mounting a volume from a tape medium, comprising:

a tape medium bin containing a plurality of tape cartridges;

a changer for selecting a tape cartridge from said tape medium bin by reading a bar-code indicating the volume on the tape cartridge, and attaching the selected tape cartridge to a tape drive;

said tape drive reading a Directory Information Table (DIT) recorded on the tape medium of said tape cartridge; thereby loading the tape cartridge; and said tape drive detecting a current track position on the tape medium on the basis of a longitudinal track; determining whether a beginning volume label or a last used area volume label is nearer to the current track position; reading the nearer volume label from the tape medium; confirming the volume by comparing the nearer volume label with the bar-code; and mounting the volume onto the tape drive system.

* * * * *